(12) United States Patent
Friedli et al.

(10) Patent No.: US 8,741,464 B2
(45) Date of Patent: Jun. 3, 2014

(54) INERTIA ENHANCED LATCHING SYSTEM

(75) Inventors: Charles W. Friedli, Lawrenceville, GA (US); Kevin K. Maggert, Lawrenceville, GA (US); Mark C. Taraboulos, Dunwoody, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 1025 days.

(21) Appl. No.: 12/395,043

(22) Filed: Feb. 27, 2009

(65) Prior Publication Data
US 2010/0221589 A1 Sep. 2, 2010

(51) Int. Cl.
*H01M 2/02* (2006.01)

(52) U.S. Cl.
USPC .......................................... 429/100; 429/96

(58) Field of Classification Search
USPC ........ 292/329, 359, 302, 303, 256.69, 34, 95, 292/111
See application file for complete search history.

(56) References Cited

U.S. PATENT DOCUMENTS

| | | | |
|---|---|---|---|
| 5,172,575 A | | 12/1992 | Fisher |
| 5,677,827 A | * | 10/1997 | Yoshioka et al. ........ 361/679.58 |
| 5,895,729 A | | 4/1999 | Phelps, III |
| 2007/0071575 A1 | | 3/2007 | Rudduck et al. |
| 2008/0238113 A1 | * | 10/2008 | Ricchitelli .................... 292/302 |

FOREIGN PATENT DOCUMENTS

KR  100803906 B1  3/2008

OTHER PUBLICATIONS

International Preliminary Report on Patentability and Written Opinion for International Patent Application No. PCT/US2010/023997 issued on Aug. 31, 2011.
"Cordless drill—Improving the battery," accessed at http://www.instructables.com/id/Cordless-drill—Improving-the-battery/.
"Black and Decker Batteries," accessed at http://www.batteryprice.com/blackanddeckerbatteries.aspx.
PCT International Search Report Dated Nov. 17, 2010.
Chinese Office Action Dated Jun. 19, 2013 for Counterpart Application 201080009612.7.

* cited by examiner

*Primary Examiner* — Maria J Laios
(74) *Attorney, Agent, or Firm* — Daniel R. Bestor

(57) ABSTRACT

An electronic device and battery are presented. The electronic device includes the battery, which has a first latch. The first latch has an arm and a hook. The arm is connected with the battery at a connected end and the hook at a free end opposed to the connected end. The hook forms a peak and a base connected with the free end. The base forms an inwardly projecting groove. The electronic device also includes a device housing forming a main cavity bound by first and second side surfaces, a rear surface and a bottom surface. The first side surface includes a ledge for receiving the groove and defines a latch cavity for receiving the first latch. In an engaged position, the peak extends into the latch cavity and the groove engages the ledge.

17 Claims, 5 Drawing Sheets

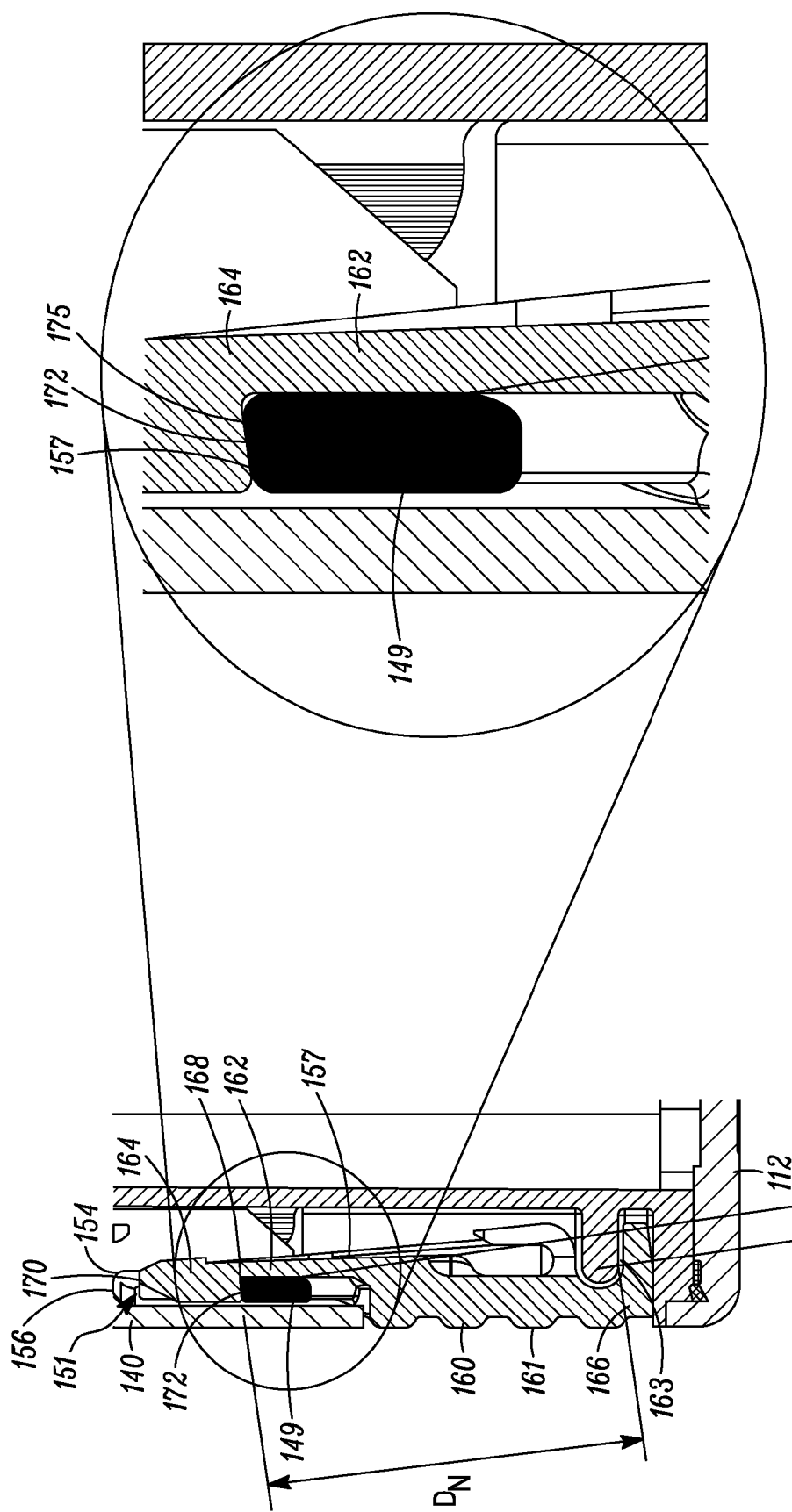

INERTIA ENHANCED LATCHING SYSTEM

FIELD OF THE INVENTION

The present invention relates to a latching system. More specifically, it relates to a battery, which employs a dual-hooking latching system in order to securely fasten the battery to a housing of an electronic device.

BACKGROUND

Portable electronic devices, such as two-way radios and telephones, typically require a portable source of power such as a battery. A battery may be conveniently attached to a housing of the electronic device and make electrical contact by way of a conventional connector. To facilitate battery replacement, mechanisms have been devised to enable the user to easily disconnect a spent battery and replace it with a freshly charged battery. Generally, the detachable battery is securely affixed to the electronic device by way of some sort of latching mechanism. Often, the latching mechanism is integrated into a battery housing.

Although their primary function is to securely fasten the battery to the electronic device, battery housing latches are typically required to perform multiple tasks. For example, the latch is used to ensure a snug fit between the battery and the electronic equipment. Furthermore, the battery often carries the burden of providing drop protection for the entire device assembly. The difficulty associated with latch design optimization is compounded by often competing design requirements. For example, while the latch should be designed to provide a snug fit between the battery assembly and the device housing (i.e., preventing disengagement when the product is dropped) the user must be able to engage and disengage the battery housing with minimal effort.

Manufacturers of portable electronic equipment are constantly trying to improve latch designs to meet these aforementioned requirements, often under cost and manufacturing constraints. It would be desirable to have a latch mechanism which prevents disengagement when the product is dropped and provides a snug fit between the battery assembly and the device housing.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 4 depicts a cross sectional view of the electronic device connected with the battery of FIG. 1, in accordance with one embodiment of the present invention.

FIG. 5 depicts an enlarged cross section view of the electronic device connected with the battery of FIG. 4, in accordance with one embodiment of the present invention.

DETAILED DESCRIPTION

By using a battery having a battery housing and a first latch extending from the battery housing, where the first latch has an arm and a hook, the hook forms a peak and a base forming an inwardly projecting groove, and by configuring the peak to extend into a latch cavity and the groove to engage a ledge, disengagement of the battery from an electronic device when the electronic device is dropped can be provided and a snug fit between the battery and the electronic device can be provided.

Figure 1:
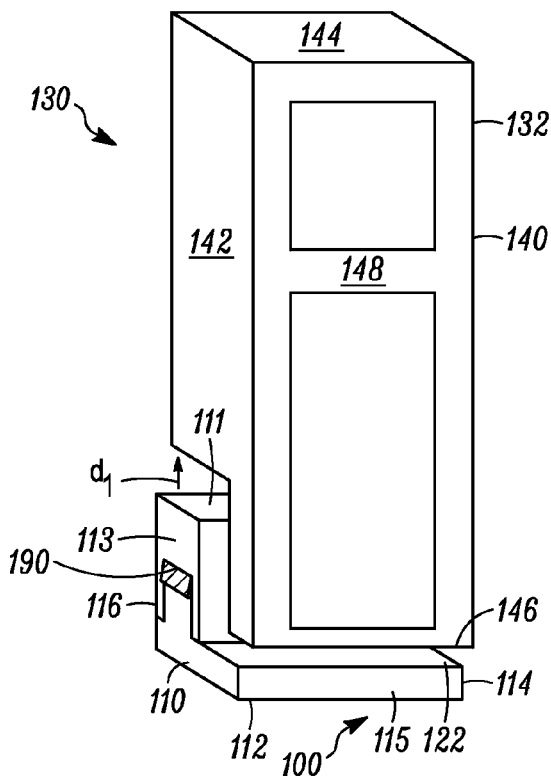
FIG. 1 depicts a front perspective view of an electronic device and a battery received by the electronic device, in accordance with one embodiment of the present invention.
Figure 2:
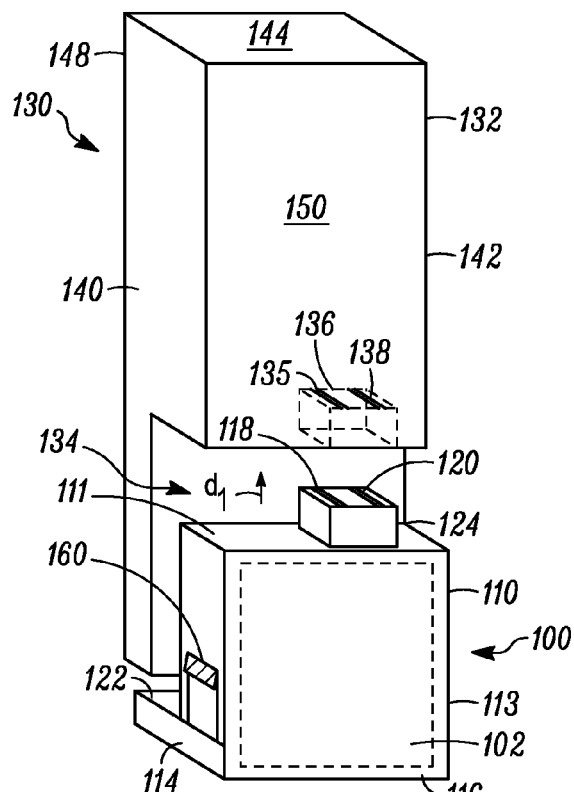
FIG. 2 depicts a rear perspective view of the electronic device and battery of FIG. 1, in accordance with one embodiment of the present invention.

Referring now to FIGS. 1 and 2, there is shown an electronic device 130 receiving a battery 100 within a main cavity 134 of the electronic device 130. Preferably, the electronic device 130 includes the battery 100. The battery 100 includes a power retaining portion 102 surrounded by a battery housing 110 and first and second latches 160, 190 extending from the battery housing 110. Power retaining portion 102 stores energy and includes things such as fuel cells, chemical battery cells, capacitors, and any device which can store energy or electrical charge.

Battery 100 also includes first and second contacts 118, 120 connected with power retaining portion 102. Power retaining portion 102 provides a flow of current to first and second contacts 118, 120. First and second contacts 118, 120 allow for current to flow from the power retaining portion 102 of the battery 100, through the housing 110, and to the electronic device 130. Contacts 118, 120 are accessible through battery housing 110, and preferable extend from or are recessed within the battery housing 110, and more preferably are exposed through the battery housing 110. Contacts 118, 120 are preferably formed from a conductive material, such as metal including copper, brass, steel, and aluminum. In one embodiment, first contact 118 forms a positive battery terminal and second electrical contact 120 forms a negative battery terminal.

Battery housing 110 surrounds power retaining portion 102 and provides openings for contacts 118, 120 to be accessible through. The battery housing 110, and any housing described herein, has portions preferably made from a semi-rigid material, yet flexible material or combination of materials, such as metal like aluminum, steel, brass; and plastic. The battery housing 110 preferably includes a top side 111 opposed to a bottom side 112, a front side 115 opposed to a rear side 116, and a first sidewall 114 opposed to a second sidewall 113, wherein the front and rear sides 115, 116 and the first and second sidewalls 114, 113 are between the top and bottom sides 111, 112. A portion 122 of the bottom side 111 of the battery housing faces the bottom side 146 of the device housing 132. In one embodiment, as shown in FIG. 2, battery housing 110 includes a protruding power coupling 124 through which contacts 118, 120 are accessible through.

Figure 3A:
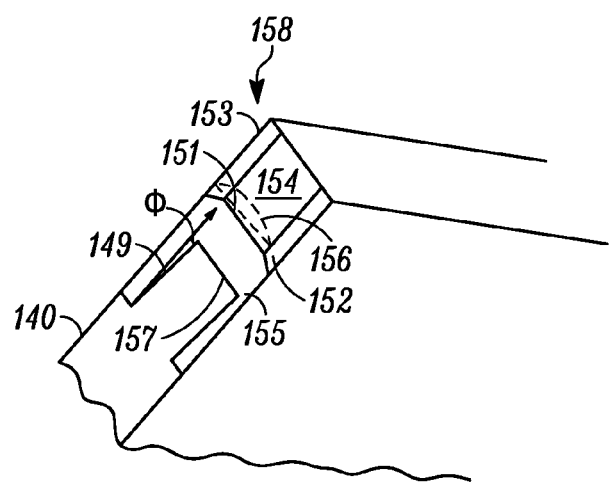
FIG. 3A depicts an enlarged rear perspective view of a main cavity formed by the electronic device of FIG. 2, in accordance with one embodiment of the present invention.
Figure 3B:
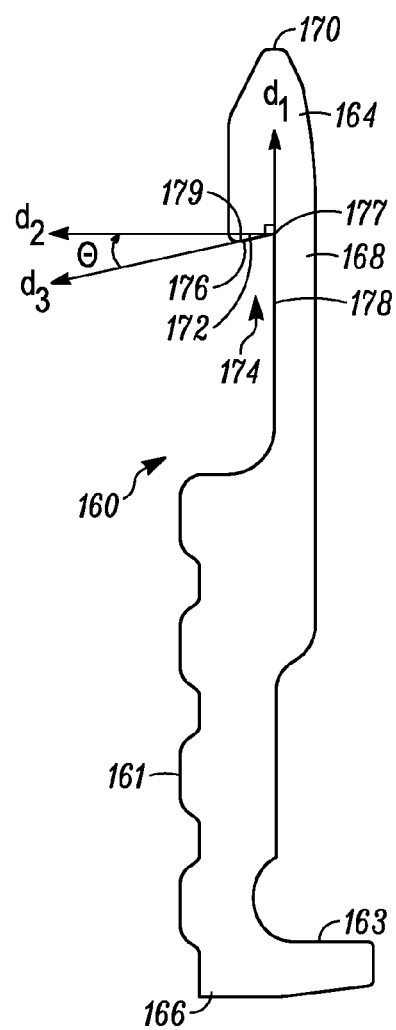
FIG. 3B depicts an enlarged view of a first latch connected with the battery of FIG. 2, in accordance with one embodiment of the present invention.
Figure 6:
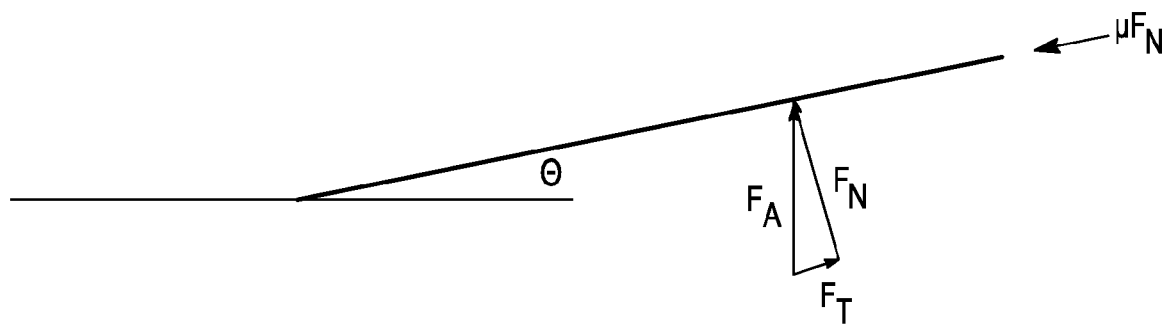
FIG. 6 depicts a force diagram of forces on a latch of the battery of FIG. 1 during a drop event, in accordance with one embodiment of the present invention.

Referring to FIGS. 3B and 4, first latch 160 extends from the battery housing 110, and preferably from a first side 113 of the battery housing 110. Preferably, first latch 160 is pivotally connected with battery housing 110 about a pivot point 163, as The first latch 160 includes an arm 162 and a hook 164 connected at a free end 168 of the arm 162. The arm 162 is connected with the battery housing 110 at a connected end 166 and the hook 164 at the free end 168 opposed to the connected end 166. The body 161 of the latch 160 between the pivot point 163 and the free end 168 is ridged to provide an enhanced tactile sensation. The hook 164 forms a peak 170 opposed to a base 172 connected with the free end 168. The base 172 forms an inwardly projecting groove 174 for mating with a corresponding ledge 149 formed by device housing 132.

Referring to FIGS. 1 and 2, electronic device 130 includes a device housing 132 forming a main cavity 134, or battery compartment, for receiving the battery 100. The electronic device 130 is any device which uses current from battery 100. Electronic device 130 includes portable electronic devices such as communications devices like telephones, walkie-talkies, and radios; entertainment devices such as portable music players, portable computers, and portable movie players; remote controls; portable GPS devices; cordless power tools; and any device which uses a battery for power. Electronic device 130 is configured to receive and connected with battery 100 within main cavity 134.

Electronic device 130 includes first and second contacts 136, 138 which engage first and second contacts 118, 120, respectively, of battery 100, so that power can be transferred from power retaining portion 102 of the battery 100 to the electronic device 130, by transmitting the power through first contact 118 and to first contact 136. Preferably, the housing 132 forms a recessed power coupling 135 above main cavity 134 through which first and second contacts 136, 138 are accessible. Recessed power coupling 135 is configured to couple or connect with protruding power coupling 124, so as to provide a secure electrical connection between the battery 100, and specifically power retaining portion 102, and the electronic device 130.

Device housing 132 surrounds electronic components within the electronic device 130. The device housing 132 preferably includes a top side 144 opposed to a bottom side 146, a front side 148 opposed to a rear side 150, and a first sidewall 140 opposed to a second sidewall 142, wherein the front and rear sides 148, 150 and the first and second sidewalls 140, 142 are between the top and bottom sides 144, 146.

On an inner surface 155 the first sidewall 140, the electronic device 130 also includes first latching mechanism 158 for engaging and mating with the first latch 160. The latching mechanism 158 includes a ledge 149 for receiving the groove 174, and forms a first latch cavity 151 for receiving the first latch 160. Ledge 149 is formed on an inner surface 155 of first sidewall 140 and includes an engagement surface 157 which projects outwards from the inner surface 155 and is configured to receive and contact a corresponding first surface 176 formed on the base 172. An angle $\phi$ is formed between the engagement surface 157 and the inner surface 155. Ledge 149 may be integrally formed with sidewall 140 or may be separately formed of the same or a different material from sidewall 140. In one embodiment, ledge 149 is separately formed from the sidewall 140 and comprises a metal, while the sidewall 140 comprises a plastic.

The first latch cavity 151 is bound by two opposing sidewall surfaces 152, 153, inner surface 155 opposed of first sidewall 140, a catch surface 154 opposed to the inner surface 155, and a ceiling surface 156 opposed to an entryway into the first latch cavity 151. The ceiling surface 156 is opposed to the peak 170 or an upper surface of the peak 170.

In an engaged position, the battery 100 is received by the main cavity 134, and the first latch 160 is mated with and engages first latching mechanism 158, wherein the groove 174 engages the ledge 149. Preferably, in the engaged position, at least the peak 170 of the hook 164 extends into the first latch cavity 151. Preferably, in the engaged position, there is a distance $D_1$ between the peak 170 and the ceiling surface 156 of the first latch cavity 151.

Figure 7:
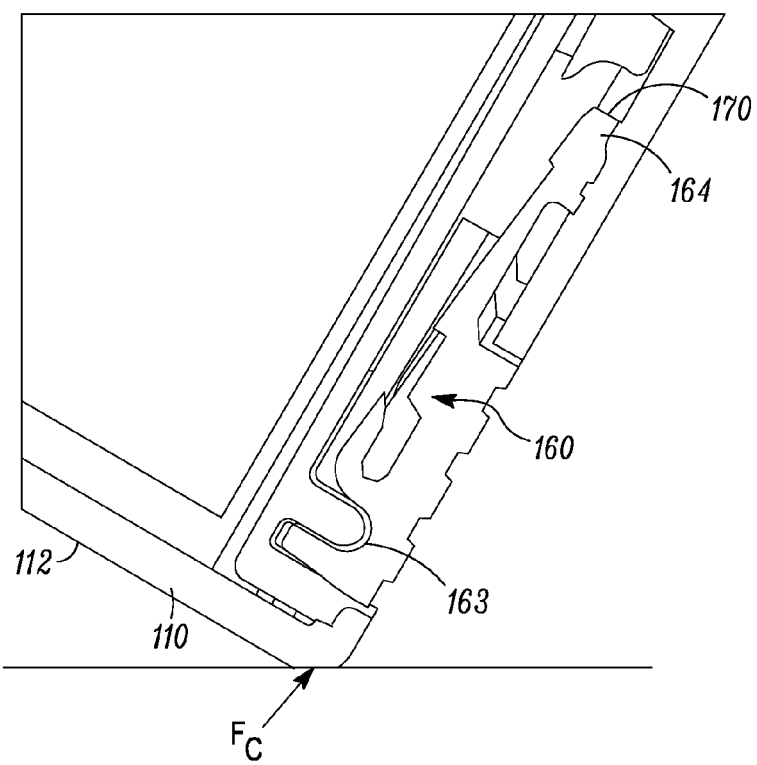
FIG. 7 depicts forces on a latch of the battery of FIG. 1 during a drop event, in accordance with one embodiment of the present invention.

Referring to FIG. 7, in a compressed position, a force $F_C$ is applied to the battery housing 110, preferably, the bottom side 112 of the battery housing 110, forcing the battery 100 further into the main cavity 134. The force $F_C$ is transferred from the battery housing to the first latch 160 and forcing the first latch 160, and specifically the peak 170, to extend into or extend further into the first latch cavity 151 so that the distance $D_1$ between the peak 170 and the ceiling surface 156 of the first latch cavity 151 is reduced. Preferably the peak 170 does not contact the ceiling surface 156 when in a compressed position. In one embodiment, the peak 170 abuts against the ceiling surface 156 of the first latch cavity 151. By having the first latch 160 extend into or extend further into the first latch cavity 151, the first latch cavity 151, and specifically surfaces 152, 153, 154, and 155 are able to surround at least a portion of the first latch 160, such as peak 170, and couple first latch 160 against inner surface 155 of first sidewall 140. By coupling first latch 160 against inner surface 155, the first latch 160 can then simply slide down inner surface 155 and reengage the first ledge 149 once the compressive force $F_C$ has ended, thus preventing first latch 160 from completely disengaging from first ledge 149.

Referring to FIGS. 1 and 2 and 3B, the battery 100 is inserted into the main cavity 134 in a first direction $d_1$. A second direction $d_2$ is normal to the first direction $d_1$. The inwardly projecting groove 174 is bound by a first surface 176 on the base 172 and a second surface 178 on the arm 162. The first surface 176 defines a third direction $d_3$ from a first side 177 of the first surface 176 adjacent the second surface 178 to an opposing side 179 of the first surface 176. An angle $\theta$ is formed between the second direction $d_2$ and the third direction $d_3$. The angle $\theta$ is preferably less fifty degrees, and more preferably less than thirty degrees, and most preferably less than fifteen degrees, and even more preferably less than ten degrees. The third direction $d_3$ is within a plane defined by the first surface 176.

Figure 8:
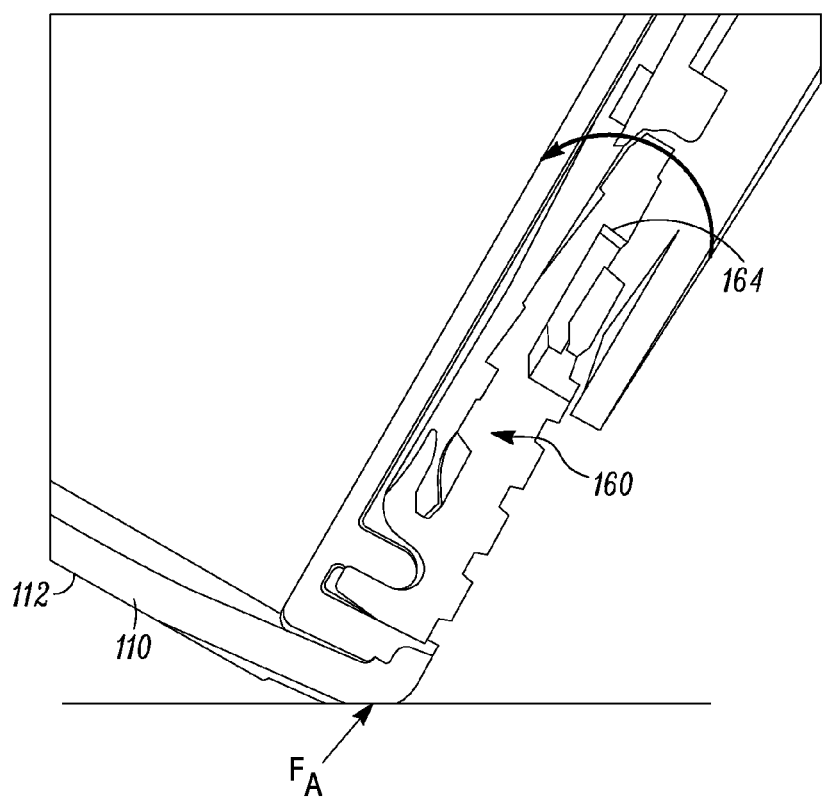
FIG. 8 depicts forces on a latch of the battery of FIG. 1 during a drop event, in accordance with one embodiment of the present invention.

Referring to FIGS. 4, 5, 6, and 8, the angle $\theta$ can also be calculated by determining the tangential and normal directions of the tangential and normal components $F_T$, $F_N$ of a force $F_A$ applied to the battery housing 110, along with the distances from the pivot point 163 to a load transfer point 175 in the tangential and normal directions. The load transfer point 175 is the point at which a force $F_A$ is transferred from the first ledge 149 to the first latch 160, and specifically to the base 172 of the first latch 160. The load transfer point 175 is located where the base surface first surface 176 of the base 172 contacts the engagement surface 157 of the first ledge 149. When the electronic device 130 and battery 100 are dropped, a force $F_A$ is applied to the electronic device 130 and battery 100 which can cause torsional loading to occur between the first latch 160 and the latching mechanism 158, as shown in FIG. 8. The force $F_A$ is applied to the device housing 132 and the battery housing 110, and then transferred from the device housing 132 to the battery housing 110 at the engagement point 175. The force $F_A$ is in the first direction $d_1$. The force $F_A$ includes a normal force component $F_N$ which is in a fourth direction $d_4$ normal to the third direction $d_3$ and a tangential force component $F_T$ in the third direction $d_3$. The distance $D_A$ between the pivot point 163 and the load transfer point 175 can be broken up into a normal distance component $D_N$ and a tangential distance component $D_T$. The normal distance component $D_N$ is in the same direction as the normal force component $F_N$, which is the fourth direction $d_4$. The tangential distance component $D_T$ is in the same direction as the tangential force component $F_T$, which is the third direction $d_3$.

The angle θ is then calculated to be at least the inverse tangent of the distance $D_N$ divided by the distance $D_T$. By breaking up the distance $D_A$ between the pivot point 163 and the load transfer point 175 into normal distance component $D_N$ and a tangential distance component $D_T$, and by calculating an angle θ to be as at least the inverse tangent of the distance $D_N$ divided by the distance $D_T$, the battery 100 is prevented from disengaging from the electronic device 130 when a force $F_A$ is applied. Preferably, the angle θ is not too much more than the inverse tangent of the distance $D_N$ divided by the distance $D_T$, so as to require less force by the user for engagement between the first latch 160 and the latching mechanism 158. Preferably, the angle θ is then calculated to be no more than twice as much as the inverse tangent of the distance $D_N$ divided by the distance $D_T$. In one embodiment, the angle θ is calculated to be no more than thirty percent more than the inverse tangent of the distance $D_N$ divided by the distance $D_T$. In one embodiment, the angle θ is calculated to be no more than ten percent more than the inverse tangent of the distance $D_N$ divided by the distance $D_T$. By breaking up the distance $D_A$ between the pivot point 163 and the load transfer point 175 into normal distance component $D_N$ and a tangential distance component $D_T$, and by calculating an angle θ to be as at least the inverse tangent of the distance $D_N$ divided by the distance $D_T$, the battery 100 is prevented from disengaging from the electronic device 130 when a force $F_A$ is applied.

In one embodiment, the distance $D_N$ is 1.72 mm and the distance $D_T$ is 18.84 mm, resulting in an angle θ of 5.19°, and preferably an angle θ of 7°, so as to account for any differences in manufacturing tolerances. Calculating an angle θ to be as at least the inverse tangent of the distance $D_N$ divided by the distance $D_T$, derives from the following:

$$F_N = F_A \cos(\theta) \quad \text{[Equation 1]}$$

$$F_T = F_A \sin(\theta) \quad \text{[Equation 2]}$$

Assuming no friction μ in the third direction $d_3$ and a static latch condition, the sum of the moments about the pivot point 163 are equal to zero, so that:

$$F_N \times D_N = F_T \times D_T \quad \text{[Equation 3]}$$

Substituting Equations 1 and 2 into Equation 3 yields:

$$\tan(\theta) = D_N / D_T \quad \text{[Equation 4]}$$

Solving for θ yields:

$$\theta = \tan^{-1}(D_N / D_T) \quad \text{[Equation 5]},$$

which is how it is determined that the angle θ should be to be as at least the inverse tangent of the distance $D_N$ divided by the distance $D_T$.

Referring to FIGS. 1 and 2, in one embodiment, the battery 100 further comprises a second latch 190 extending from the battery housing 110, and the electronic device 130 further includes a second latch mechanism formed in the second sidewall on an inner surface of the second sidewall 142 of the device housing 132 for engaging and mating with the second latch 190. The second latch 190 is the mirror image of the first latch 160 and includes all of the same elements of the first latch 160, such as an arm and a hook, where the arm is connected with the battery housing 110 at a connected end and the hook at a free end opposed to the connected end, and where the hook forms a peak and a base connected with the free end, the base forming an inwardly projecting groove. Referring to FIGS. 1 and 2, the first latch 160 is positioned on a first sidewall 140 of the battery housing 132 and the second latch 190 is positioned on a second sidewall of the battery housing 132 opposed to the first sidewall 140. By using a second latch 190, the battery housing 110 is able to further secure the battery 100 to the electronic device 130 when in an engaged position.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. An electronic device comprising:
   a battery having a battery housing;
   a first latch extending from the battery housing, the first latch having an arm and a hook, the arm connected with the battery housing at a connected end and the hook at a free end opposed to the connected end, the hook forming a peak and a base connected with the free end, the base forming an inwardly projecting groove; and
   a device housing forming a main cavity for receiving the battery, a ledge for receiving the groove, and a latch cavity for receiving the first latch, wherein in an engaged position, the groove engages the ledge
   wherein the battery is inserted into the main cavity in a first direction $d_1$;
   wherein a second direction $d_2$ is normal to the first direction $d_1$; and
   wherein the inwardly projecting groove is bound by a first surface on the base and a second surface on the arm, wherein the first surface defines a third direction $d_3$, from a first side of the first surface adjacent the second surface to an opposing side of the first surface, angularly offset from the second direction $d_2$ such that the third direction $d_3$ is oblique to both the first direction $d_1$ and the second direction $d_2$ and such that the third direction $d_3$ is angularly offset from the second direction $d_2$ by less than 50 degrees.

2. The electronic device of claim 1, wherein the latch cavity is bound by two opposing sidewall surfaces, an inner surface of the device housing opposed to a catch surface, and an upper ceiling surface, wherein the upper ceiling surface is opposed to the peak, wherein in a compressed position where a compressive force $F_C$ is applied to the latch, the peak extends further into the latch cavity and a distance between the peak and the ceiling surface of the latch cavity is reduced.

3. The electronic device of claim 2, wherein the peak abuts against the ceiling surface of the latch cavity.

4. The electronic device of claim 1, wherein an angle θ is formed between the second direction d2 and the third direction $d_3$, and wherein the angle θ is less than ten degrees such that the third direction $d_3$ is angularly offset from the second direction $d_2$ by less than ten degrees.

5. The electronic device of claim 1,
wherein an angle $\theta$ is formed between the second direction $d_2$ and the third direction $d_3$,
wherein a force $F_A$ is applied to the latch in the first direction $d_1$ by the device housing, wherein the force $F_A$ includes a normal component $F_N$ which is in a fourth direction $d_4$ normal to the third direction $d_3$ and a tangential component $F_T$ in the third direction $d_3$, wherein the first latch pivots with respect to the battery housing about a pivot point, wherein a distance $D_A$ from the pivot point to a load transfer point on the first surface can be broken up into a normal distance component $D_N$ and a tangential distance component $D_T$, wherein the normal distance component $D_N$ is in the same direction as the normal force component $F_N$, which is the fourth direction $d_4$, wherein the tangential distance component $D_T$ is in the same direction as the tangential force component $F_T$, which is the third direction $d_3$, and wherein the angle $\theta$ is at least as much as the inverse tangent of the distance $D_N$ divided by the distance $D_T$.

6. The electronic device of claim 1, further comprising a second latch extending from the battery housing, the second latch having an arm and a hook, the arm connected with the battery housing at a connected end and the hook at a free end opposed to the connected end, the hook forming a peak and a base connected with the free end, the base forming an inwardly projecting groove.

7. The electronic device of claim 1, wherein the third direction $d_3$ is angularly offset from the second direction $d_2$ by between 5.19 and 50 degrees.

8. A battery for receipt by a main cavity of a device housing of an electronic device, the device housing forming a ledge and a latch cavity above the ledge, the battery comprising:
a battery housing; and
a first latch extending from the battery housing, the first latch having an arm and a hook, the arm connected with the battery housing at a connected end and the hook at a free end opposed to the connected end, the hook forming a peak and a base connected with the free end, the base forming an inwardly projecting groove, wherein the peak is configured to extend into the latch cavity and the groove is configured to engage the ledge;
wherein the battery is configured to be inserted into the main cavity in a first direction $d_1$;
wherein a second direction $d_2$ is normal to the first direction $d_1$; and
wherein the inwardly projecting groove is bound by a first surface on the base and a second surface on the arm, wherein the first surface defines a third direction $d_3$, from a first side of the first surface adjacent the second surface to an opposing side of the first surface, angularly offset from the second direction $d_2$ such that the third direction $d_3$ is oblique to both the first direction $d_1$ and the second direction $d_2$ and such that the third direction $d_3$ is angularly from the second direction $d_2$ by less than 50 degrees.

9. The battery of claim 8, wherein an angle $\theta$ is formed between the second direction $d_2$ and the third direction $d_3$, and wherein the angle $\theta$ is less than ten degrees such that the third direction is offset from the second direction by less than ten degrees.

10. The battery of claim 8, further comprising a second latch extending from the battery housing, the second latch having an arm and a hook, the arm connected with the battery housing at a connected end and the hook at a free end opposed to the connected end, the hook forming a peak and a base connected with the free end, the base forming an inwardly projecting groove.

11. The battery of claim 8, wherein the third direction $d_3$ is angularly offset from the second direction $d_2$ by between 5.19 and 50 degrees.

12. An electronic device comprising:
a battery having a first latch, the first latch having an arm and a hook, the arm connected with the battery at a connected end and the hook at a free end opposed to the connected end, the hook forming a peak and a base connected with the free end, the base forming an inwardly projecting groove; and
a device housing forming a main cavity bound by first and second side surfaces, a rear surface and a bottom surface, wherein the first side surface includes a ledge for receiving the groove and defines a latch cavity for receiving the first latch, wherein in an engaged position, the peak extends into the latch cavity and the groove engages the ledge;
wherein the battery is inserted into the main cavity in a first direction $d_1$;
wherein a second direction $d_2$ is normal to the first direction $d_1$; and
wherein the inwardly projecting groove is bound by a first surface on the base and a second surface on the arm, wherein the first surface defines a third direction $d_3$, from a first side of the first surface adjacent the second surface to an opposing side of the first surface, angularly offset from the second direction $d_2$ such that the third direction $d_3$ is oblique to both the first direction $d_1$ and the second direction $d_2$ and such that the third direction $d_3$ is angularly from the second direction $d_2$ by less than 50 degrees.

13. The electronic device of claim 12, wherein the latch cavity is bound by two opposing sidewall surfaces, an inner surface of the device housing opposed to a catch surface, and an upper ceiling surface, wherein the upper ceiling surface is opposed to the peak, wherein in a compressed position where a compressive force $F_C$ is applied to the latch, the peak extends further into the latch cavity and a distance between the peak and the ceiling surface of the latch cavity is reduced.

14. The electronic device of claim 12, wherein the latch cavity is bound by two opposing sidewall surfaces, an inner surface of the device housing opposed to a catch surface, and an upper ceiling surface, wherein the upper ceiling surface is opposed to the peak, wherein in a compressed position where a compressive force $F_C$ is applied to the latch, the peak extends further into the latch cavity and an interior side of the peak abuts the catch surface.

15. The electronic device of claim 12,
wherein an angle $\theta$ is formed between the second direction $d_2$ and the third direction $d_3$,
wherein a force $F_A$ is applied to the latch in the first direction $d_1$ by the device housing, wherein the force $F_A$ includes a normal component $F_N$ which is in a fourth direction $d_4$ normal to the third direction $d_3$ and a tangential component $F_T$ in the third direction $d_3$, wherein the first latch pivots with respect to the battery housing about a pivot point, wherein a distance $D_A$ from the pivot point to a load transfer point on the first surface can be broken up into a normal distance component $D_N$ and a tangential distance component $D_T$, wherein the normal distance component $D_N$ is in the same direction as the normal force component $F_N$, which is the fourth direction $d_4$, wherein the tangential distance component $D_T$ is in the same direction as the tangential force component $F_T$, which is the third direction $d_3$, and wherein the angle $\theta$ is at least as much as the inverse tangent of the distance $D_N$ divided by the distance $D_T$.

16. The electronic device of claim 12, wherein the battery has a second latch, the second latch having an arm and a hook, the arm connected with the battery at a connected end and the hook at a free end opposed to the connected end, the hook forming a peak and a base connected with the free end, the base forming an inwardly projecting groove.

17. The electronic device of claim 12, wherein the third direction $d_3$ is angularly offset from the second direction $d_2$ by between 5.19 and 50 degrees.

* * * * *

UNITED STATES PATENT AND TRADEMARK OFFICE
CERTIFICATE OF CORRECTION

PATENT NO.        : 8,741,464 B2  
APPLICATION NO.   : 12/395043  
DATED             : June 3, 2014  
INVENTOR(S)       : Charles W. Friedli et al.

Page 1 of 1

It is certified that error appears in the above-identified patent and that said Letters Patent is hereby corrected as shown below:

IN THE CLAIMS:

In Column 6, Line 66, in Claim 4, delete "d2" and insert -- $d_2$ --, therefor.

In Column 7, Line 57, in Claim 8, delete "is angularly from" and insert -- is angularly offset from --, therefor.

In Column 8, Line 33, in Claim 12, delete "is angularly from" and insert -- is angularly offset from --, therefor.

Signed and Sealed this  
Third Day of May, 2016

Michelle K. Lee  
*Director of the United States Patent and Trademark Office*